(12) United States Patent
Boursier et al.

(10) Patent No.: US 9,131,710 B2
(45) Date of Patent: Sep. 15, 2015

(54) VEGETABLE MILK GRANULATED POWDER, PROCESS FOR PRODUCING VEGETABLE MILK, AND USES THEREOF

(75) Inventors: Bernard Boursier, Violaines (FR); Bruno Gehin, Sailly sur la Lys (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 13/203,038

(22) PCT Filed: Feb. 25, 2010

(86) PCT No.: PCT/FR2010/050330
§ 371 (c)(1),
(2), (4) Date: Aug. 24, 2011

(87) PCT Pub. No.: WO2010/100370
PCT Pub. Date: Sep. 10, 2010

(65) Prior Publication Data
US 2012/0015078 A1   Jan. 19, 2012

(30) Foreign Application Priority Data

Mar. 2, 2009   (FR) .................................. 09 51293
Mar. 2, 2009   (FR) .................................. 09 51294

(51) Int. Cl.
| | | |
|---|---|---|
| A23L 1/305 | (2006.01) | |
| A23J 1/14 | (2006.01) | |
| A23C 11/10 | (2006.01) | |
| A23J 3/14 | (2006.01) | |
| A23L 1/00 | (2006.01) | |
| A23L 1/09 | (2006.01) | |
| A23L 2/39 | (2006.01) | |

(52) U.S. Cl.
CPC ................. *A23J 1/14* (2013.01); *A23C 11/103* (2013.01); *A23J 3/14* (2013.01); *A23L 1/002* (2013.01); *A23L 1/095* (2013.01); *A23L 1/3055* (2013.01); *A23L 2/39* (2013.01); *A23V 2002/00* (2013.01)

(58) Field of Classification Search
USPC ........................................................ 426/656
See application file for complete search history.

(56) References Cited

U.S. PATENT DOCUMENTS

| | | | |
|---|---|---|---|
| 6,056,949 A | 5/2000 | Menzi et al. | |
| 2002/0146487 A1 | 10/2002 | Tsukuda et al. | |
| 2008/0226811 A1* | 9/2008 | Boursier et al. | .............. 426/656 |

FOREIGN PATENT DOCUMENTS

| | | |
|---|---|---|
| EP | 0787437 | 8/1997 |
| EP | 0796567 | 9/1997 |
| EP | 1112693 | 7/2001 |
| WO | WO 2005/063058 | 7/2005 |

OTHER PUBLICATIONS

Written Opinion in International Application No. PCT/FR2010/050330, May 10, 2010, pp. 1-9.
Shand, P. J. et al. "Physicochemical and textural properties of heat-induced pea protein isolate gels" *Food Chemistry*, 2007, pp. 1119-1130, vol. 102.
Kuntz, L. A. et al. "Making the Most of Maltodextrins" Aug. 1, 1977, pp. 1-14, obtained from www.foodproductdesign.com.
Juszczak, L. et al. "Effect of Maltodextrins on the Rheological Properties of Potato Starch Pastes and Gels" *International Journal of Food Science*, 2013, Article ID 869362, vol. 2013, pp. 1-7.

* cited by examiner

*Primary Examiner* — Elizabeth Gwartney
(74) *Attorney, Agent, or Firm* — Saliwanchik, Lloyd & Eisenschenk

(57) ABSTRACT

The present invention relates to a vegetal milk, in the form of a granulated powder or of a solution, produced from vegetable raw materials and capable of replacing milk of animal origin, and more particularly cow's milk, and also the uses thereof as novel products intended for human foodstuffs. The present invention also relates to a process for preparing such vegetable milk.

18 Claims, No Drawings

VEGETABLE MILK GRANULATED POWDER, PROCESS FOR PRODUCING VEGETABLE MILK, AND USES THEREOF

CROSS-REFERENCE TO RELATED APPLICATION

This application is the U.S. national stage application of International Patent Application No. PCT/FR2010/050330, filed. Feb. 25, 2010, the disclosure of which is hereby incorporated by reference in its entirety, including all figures, tables and amino acid or nucleic acid sequences.

FIELD OF THE INVENTION

The subject of the present invention is a vegetable milk in the form of a granulated powder or of a solution, produced from vegetable raw materials and capable of replacing milk of animal origin, and more particularly cow's milk, and also the uses thereof as novel products intended for human foodstuffs. The present invention also relates to a process for preparing such vegetable milk.

TECHNICAL BACKGROUND

Man has existed for more than 3 million years, but has learnt to drink milk only since 12 000 years. The domestication of mammals has enabled man to take advantage of milk produced by all sorts of animals: cows, buffalo, she-assess, goats.

Furthermore, milk has become a central food in human nutrition. Today, worldwide milk production is close to 650 000 million tons. Cow's milk represents 85% of said production. This worldwide production is growing constantly as the years go by, having increased by more than 20% in ten years. Milk is a food which contains a not insignificant protein source of high biological quality. Proteins represent, after carbohydrates and lipids, the third major energy source in our diet. They are essential to our survival and are provided both by products of animal origin (meats, fish, eggs, dairy products) and by plant foods (cereals, legumes, etc.). For a long time, animal proteins have proved to be tremendously successful in terms of their excellent nutritional qualities since they contain all the essential amino acids in adequate proportions. On the other hand, none of the various sources of vegetable proteins can, by themselves, cover all the amino acid needs: one or more essential amino acids are often lacking.

In parallel, certain animal proteins can be allergenic, leading to reactions which are very bothersome, or even dangerous, in everyday life.

Food allergies are constantly on the increase. They have gone from 1% in 1970 to 6 to 8% of the population today. Allergies of this type more readily involve young children, with 7 to 8% thus being involved, whereas the percentage of adults ranges from 3 to 4%. In addition, the number of cases of severe allergies is also tending to increase. Thus, the increasing number of cases of anaphylactic shock directly related to the consumption of allergenic food products has risen by 700% in 17 years!

Dairy product allergy is one of the most widespread allergic reactions. Studies demonstrate that 65% of individuals who suffer from food allergies are allergic to milk. The adult form of milk allergy, herein referred to as "dairy products allergy", is a reaction of the immune system which creates antibodies in order to combat the unwanted food. This allergy is different than Cow's Milk Protein (bovine protein) Allergy (CMPA), which affects newborns and infants. The clinical manifestations of this allergy are mainly gastrointestinal (50 to 80% of cases), and also cutaneous (10 to 39% of cases) and respiratory (19% of cases). This allergy is the first food allergy to appear in children, and most commonly begins in infants less than a year old. CMPA causes varied symptoms, such as urticaria, eczema, angio-edema possibly affecting the face, the lips, the tongue, the soft palate, the larynx and the vocal chords in serious cases, constipation, diarrhea, flatulence, nausea, migraines, infections, abdominal cramps, nasal congestion and even serious asthma attacks. CMPA can also manifest itself through anaphylactic shock and also through a syndrome termed "near-miss sudden death", and observations of newborn sudden death related to cow's milk anaphylaxis have even been reported.

Allergic individuals should completely eliminate milk, dairy products and derivatives thereof from their diet. Moreover, milk from other animal species is contraindicated in cases of CMPA. The following terms are indicators of the presence of cow's milk or derivatives thereof in the ingredients of a product: buttermilk, calcium caseinate, sodium caseinate, casein, caseinate, hydrolyzed casein, dried milk solids, lactalbumin, lactose, lactoglobulin, low-fat milk, milk powder, condensed milk and whey.

In view of all the disadvantages mentioned above, associated with the consumption of milk proteins, there is, as a result, great interest in the use of substitute proteins, also called alternative proteins, classified among which are vegetable proteins.

Such is the case, for example, of the emergence of many vegetable milks that can be introduced into infant nutrition from the age of 5 months.

In legal terms, only one clear definition, dating from 1909, exists defining milk of animal origin: "milk is the integral product of the complete and uninterrupted milking of a healthy well-nourished milking female which is not overworked. It should be collected cleanly and not contain colostrum. The word milk without any specification is cow's milk. Any other milk should be denoted by the name "milk" preceded by the indication of the animal species: "goat's milk", "ewe's milk", "mare's milk".

Vegetable milks, produced from vegetable ingredients, can be an alternative to milks of animal origin. They overcome and avoid CMPA. They are free of casein, of lactose and of cholesterol, are rich in vitamins and in mineral salts, and also rich in essential fatty acids but low in saturated fatty acids. Some also have advantageous fiber levels.

Generally, vegetable milks are quite low in calcium. Calcium is a trace element, the main function of which is the mineralization of bone in the form of calcium phosphate salts. In adults, the renewal of calcium in the bone mobilizes approximately 700 mg of calcium per day. Calcium is also involved in blood coagulation, in muscle contraction and in many enzyme reactions at the cellular level. Calcium is essential at any age because it makes our bones solid, but certain periods in life require particular vigilance. Babies thus particularly need calcium. At birth, a baby will need approximately 300 mg of calcium per day.

In addition to the fact that some vegetable milks are low in calcium, and that others, owing to their botanical rarity, are commercially unavailable, it should also be mentioned that some vegetable milks are also allergenic. This is the case, for example, of vegetable milks prepared from oleaginous plants, for instance soya milks.

Soya can cause serious, or even lethal reactions in sensitive individuals. Today, soya is acknowledged to be one of the "eight major allergens" causing immediate hypersensitivity reactions resulting in coughing, sneezing, nasal hydrorrhea, urticaria, diarrhea, facial edema, shortness of breath, swelling of the tongue, swallowing problems, a drop in arterial pressure, excessive perspiration, fainting, anaphylactic shock or even death in the most severe cases. Soya is thought to contain between 25 and 30 allergenic components. In addition, soya contains isoflavones (genistein, daidzein, glycetein), phytoestrogens that are completely advised against in children less than three years old. This is because the Agence Française de Sécurité Sanitaire des Aliments (AFSSA) [French Food Safety Agency] strongly suspects these compounds of disrupting sexual development in children, owing to their structure that is very close to animal female hormones.

Thus, soya-based formula is far from being the best solution for bottle-fed babies who are allergic to the conventional milky preparations. The phytoestrogens contained in soya can interfere with correct development of the thyroid, the brain and the reproductive system of the baby. Soya formula also does not constitute the ideal solution to cow's milk allergy.

An unpublished study carried out by Dr Stefano Guandalini of the Department of Pediatrics of the University of Chicago has shown "that a significant number of children exhibiting intolerance to cow's milk proteins develop intolerance to soya proteins when soya milk is introduced into their diet". So many babies allergic to cow's milk are also allergic to soya milk that researchers have begun to advise pediatricians to stop recommending soya milk and to instead prescribe non-allergenic vegetable preparations such as rice milk, for example.

Soya also appears to have a negative influence on celiac disease. This disease is a serious malabsorption syndrome, most commonly associated with gluten (protein fraction present in wheat and some other cereals) and with intolerance to milk. However, few individuals are aware that soya may also be implicated. Some adults with celiac disease suffer from diarrhea, headaches, nausea and flatulence even when they eliminate gluten from their diet and consume tiny amounts of soya. An unpublished study carried out on 98 children and babies with multiple gastrointestinal allergies revealed that 62% were allergic both to soya and to milk and that 35% were allergic both to soya and to gluten.

Finally, if soya allergies are on the increase, it is perhaps also the fault of genetically modified soya seeds. In the United Kingdom, York Nutritional Laboratories, one of the leading European laboratories specializing in food sensitivity, observed a 50%; increase in soya allergies in 1998, the year in which genetically modified soya appeared on the world market. These researchers observed that one of the 16 most allergenic soya proteins was present at concentrations of 30% or more in the genetically modified soya. Individuals who are allergic to genetically modified soya are perhaps not even allergic to ordinary soya. It is not out of the question that the guilty parties are allergenic exogenous proteins introduced during mutations.

In view of all the disadvantages of milk proteins, but also of the dangerous allergenic nature conferred by certain vegetable proteins, there is a real demand, on the part of consumers, which has not been met to date, for vegetable milks which are unquestionably and acknowledged to be innocuous and which can, as a result, be consumed by the entire family. Conventional manufacturers are also beginning to seek new sources of proteins in order to enrich their products.

Document WO 96/04800 describes a process for preparing almond milk and the products obtained. However, even though these products are intended for replacing cow's milk, they nonetheless have a very strong allergenic potential. This is because almonds are among the oleaginous fruits (like soya) and are known for their very high allergenicity, which in some individuals can manifest itself through a violent anaphylactic shock that can lead to death. Consequently, the products described in that document do not solve the problem of the present invention.

Document EP 1859 692 A1 describes a vegetable drink composition containing water and at least one fiber. The objective sought is not the replacement of animal milk, and said compositions of this document do not contain proteins.

Document EP 1696749 B1 describes a process for making a powdered preparation for obtaining a neutral or slightly acidic beverage, the pH of which can range from 5.5 to 8, following mixing of the powdered preparation with a liquid. Said compositions comprise a source of proteins and a quite specific stabilizer. The objective of this document is absolutely not to find a way to formulate a vegetable milk capable of replacing cow's milk.

The applicant company also focused in on this research in order to be able to meet the increasing demands from manufacturers and consumers for compounds having advantageous nutritional properties without however, having the drawbacks of certain already-existing compounds. The studies by the applicant have related to the formulation of novel vegetable milks which are unquestionably and acknowledged to be innocuous, and which can, as a result, be consumed by the entire family.

Thus, the applicant has carried out considerable research studies on Vegetable Protein Materials (VPM) as food ingredients, and more especially on pea proteins. This particular interest in pea proteins is first of all due to their numerous functional properties, but also to advantageous nutritional qualities by virtue of their "essential" amino acid composition.

More particularly, the studies by the applicant have related to the formulation of a novel drink composition containing, inter alia, pea proteins and capable, once suspended in water, of replacing cow's milk.

SUMMARY OF THE INVENTION

The applicant has, to its credit, discovered that pea proteins can, surprisingly, advantageously replace milk proteins in drinks, while at the same time retaining nutritional and organoleptic qualities which are at least equivalent to, or even greater than, those of the initial drink.

In point of fact, the applicant company has, to its credit, reconciled all the objectives reputed up until now to be difficult to reconcile, by proposing a novel composition containing, inter alia, pea proteins, characterized in that it:
  combines a pea protein and a starch hydrolyzate, itself having an advantageous and desired functional characteristic and/or nutritional characteristic and/or technological characteristic,
  is in dry but nonpulverulent form, i.e. in granular form, it is referred to as a granulated powder,
  has a dry matter content of greater than 80%, preferably greater than 85%, and even more preferably greater than 90%,
  has an "instant" nature, i.e. this granulated powder has very good wettability, dispersibility and solubility in water.

This instant nature will be very appreciated when placing said granulated powder in a suspension for the formulation of a drink, and more particularly of a vegetable milk.

Said granulated powder is characterized in that it exhibits excellent dispersion in water and better dissolution under cold conditions, and better flowability for metering operations, and in that it offers a better environment for handling the powders owing to the absence of dust.

The subject of the present invention is therefore a granulated vegetable milk powder comprising at least one pea protein composition and at least one starch hydrolyzate, characterized in that it has a laser volume mean diameter D4,3 of between 10 µm and 500 µm, preferably between 50 µm and 350 µm, and even more preferably between 70 µm and 250 µm, and a dry matter content, determined after stoving at 130° C. for 2 hours, of greater than 80%, preferably greater than 85%, and even more preferably greater than 90%.

The subject of the present invention is also a vegetable milk produced by dissolving, in water, a granulated vegetable milk powder comprising a pea protein composition and at least one starch hydrolyzate, and having a laser volume mean diameter D4,3 of between 10 µm and 500 µm, preferably between 50 µm and 350 µm, and even more preferably between 70 µm and 250 µm, and a dry matter content, determined after stoving at 130° C. for 2 hours, of greater than 80%, preferably greater than 85%, and even more preferably greater than 90%, at a dissolution rate of between 2% and 30% by dry weight, preferably between 2% and 20%, even more preferably between 3% and 15%, and in particular between 5% and 10%.

The subject of the present invention is also a vegetable milk comprising an aqueous solution of a pea protein composition and of at least one starch hydrolyzate.

In addition, the subject of the present invention is a process for preparing a vegetable milk, characterized in that a granulated powder comprising a pea protein composition and at least one starch hydrolyzate, and having a laser volume mean diameter D4,3 of between 10 µm and 500 µm, preferably between 50 µm and 350 µm, and even more preferably between 70 µm and 250 µm, and a dry matter content, determined after stoving at 130° C. for 2 hours, of greater than 80%, preferably greater than 85%, and even more preferably greater than 90%, is suspended in water at dissolution rate of between 2% and 30% by dry weight, preferably between 2% and 20%, even more preferably between 3% and 15%, and in particular between 5% and 10%.

DETAILED DESCRIPTION OF EMBODIMENTS

The present invention relates to a granulated vegetable milk powder comprising at least one pea protein composition and at least one starch hydrolyzate, characterized in that it has a laser volume mean diameter D4,3 of between 10 µm and 500 µm, preferably between 50 µm and 350 µm, and even more preferably between 70 µm and 250 µm, a dry matter content, determined after stoving at 130° C. for 2 hours, of greater than 80%, preferably greater than 85%, and even more preferably greater than 90%.

In the present application, the name "vegetable milk" is used and concerns a drink which is not derived from milk of animal origin, and more particularly from cow's milk.

In one preferred embodiment of the present invention, said vegetable milk contains only vegetable ingredients.

Said granulated vegetable milk powder comprising at least one pea protein and at least one starch hydrolyzate makes it possible to replace and completely eliminate cow's milk in the daily diet, while at the same time providing nutritional intakes that are at least equivalent, or even improved, compared with those provided with the conventional consumption of cow's milk.

For the purposes of the present invention, the terms "vegetable milk", "pea milk", "drink" and "vegetable drink" will be used without distinction to denote said drink produced or capable of being produced after dissolving of the granulated vegetable milk powder of the present invention.

In the present invention, said granulated vegetable milk powder is characterized in that the weight ratio of the pea protein to the starch hydrolyzate is between 99:1 and 1:99, preferably between 80:20 and 20:80, even more preferably between 65:35 and 35:65, and in particular between 55:45 and 45:55.

In the present invention, said granulated vegetable milk powder is characterized in that the sum of the amounts of pea protein and of starch hydrolyzate is between 30% and 100%, and preferably between 50% and 100%, of the total mass of said granulated powder (dry/dry).

In the present invention, the name "pea" is understood to mean all plants belonging to the family of leguminous plants, and more particularly to the family of Papilionaceae.

This definition includes in particular all the plants described in any one of the tables contained in the article by R. Hoover et al., 1991 (Hoover R. (1991) "Composition, structure, functionality and chemical modification of legume starches: a review" Can. J. Physiol. Pharmacol., 69 pp. 79-92).

According to one preferred embodiment of the present invention, the vegetable protein belongs to the leguminous plants proteins.

According to another preferred embodiment, the leguminous plant protein is chosen from the group comprising pea, bean, soybean, broad bean and horse bean, and mixtures thereof.

Even more preferably, said leguminous plant protein is pea.

The term "pea" is here considered in its broadest sense, and includes in particular:
- all wild-type varieties of smooth pea and of wrinkled pea, and
- all mutant varieties of smooth pea and of wrinkled pea, irrespective of the uses for which said varieties are generally intended (food for human consumption, animal feed and/or other uses).

Said mutant varieties are in particular those known as "r mutants", "rb mutants", "rug 3 mutants", "rug 4 mutants", "rug 5 mutants" and "lam mutants" as described in the article by C-L Heydley et al., entitled "Developing novel pea starches" Proceedings of the Symposium of the Industrial Biochemistry and Biotechnology Group of the Biochemical Society, 1996, pp. 77-87.

Indeed, pea is the leguminous plant with protein-rich seeds which, since the 1970s, has been most widely developed in Europe and mainly in France, not only as a protein source for animal feed, but also for human diet.

The pea proteins are, like all leguminous plant proteins, made up of three main classes of proteins: globulins, albumins and "insoluble" proteins.

The value of pea proteins lies in their good emulsifying capacities, their lack of allergenicity and their low cost, which makes an economical functional ingredient. By virtue of their specific amino acid composition, pea proteins also have considerable nutritional value.

Furthermore, the pea proteins contribute favorably to sustainable development and their carbon impact is very positive. This is because the pea cultivation is environmentally friendly and does not require nitrogenous fertilizers, since pea fixes nitrogen from the air.

According to the present invention, the term "pea protein" preferably denotes the pea proteins which are mainly in native globular form, globulins, or albumins.

Even more preferably, the pea proteins used according to the invention are in the form of a composition of pea proteins, having:
- a total protein content (N×6.25), expressed in grams of dry product, of at least 60% by weight of dry product. Preferably, in the context of the present invention, use is made of a protein composition having a high protein content of between 70% and 97% by weight of dry product, preferably between 76% and 95%, even more preferably between 78% and 88%, and in particular between 78% and 85%,
- a soluble protein content, expressed according to a test for measuring the water-solubility of proteins, of between 20% and 99%. Preferably, in the context of the present invention, use is made of a protein composition having a high soluble protein content of between 35% and 95%, preferably between 45% and 90%, even more preferably between 50% and 80%, and in particular between 55% and 75%.

In order to measure the total protein content, the soluble nitrogenous fraction contained in the sample can be quantitatively determined according to the Kjeldahl method, and then the total protein content is obtained by multiplying the nitrogen content, expressed as percentage weight of dry product, by the factor 6.25. This method is well known to those skilled in the art.

In the present invention, the total protein content can also be measured by quantitatively determining the soluble nitrogenous fraction contained in the sample according to the method of A. Dumas, 1831, Annales de chimie [Annals of chemistry], 33, 342, as cited by Buckee, 1994, in Journal of the Institute of Brewing, 100, pp. 57-64, and then the total protein content is obtained by multiplying the nitrogen content, expressed as percentage weight of dry product, by the factor 6.25. This method, also known as the combustion method for determining nitrogen, consists of total combustion of the organic matrix under oxygen. The gases produced are reduced by copper and then dried, and the carbon dioxide is trapped. The nitrogen is then quantified using a universal detector. This method is well known to those skilled in the art.

To determine the soluble protein content, the content of proteins soluble in water of which the pH is adjusted to 7.5+/−0.1 using a solution of HCl or NaOH is measured by means of a method of dispersion of a test specimen of the sample in distilled water, centrifugation and analysis of the supernatant. 200.0 g of distilled water at 20° C.+/−2° C. are placed in a 400 ml beaker, and the whole is stirred magnetically (magnetic bar and rotation at 200 rpm). Exactly 5 g of the sample to be analyzed are added. The mixture is stirred for 30 min, and centrifuged for 15 min at 4000 rpm. The method for determining nitrogen is carried out on the supernatant according to the method previously described.

These pea protein compositions preferably contain more than 50%, 60%, 70%, 80% or 90% of proteins of more than 1000 Da. In addition, these pea protein compositions preferably have a molecular weight distribution profile consisting of:
- 1% to 8%, preferably from 1.5% to 4%, and even more preferably from 1.5% to 3% of proteins of more than 100 000 Da,
- 20% to 55%, preferably from 25% to 55% of proteins of more than 15 000 and of at most 100 000 Da,
- 15% to 30% of proteins of more than 5000 and of at most 15 000 Da,
- and from 25% to 55%, preferably from 25% to 50%, and even more preferably from 25% to 45% of proteins of at most 5000 Da.

The determination of the molecular weights of the proteins constituting said pea protein compositions is carried out by size exclusion chromatography under denaturing conditions (SDS+2-mercaptoethanol); the separation is carried out according to the size of the molecules to be separated, the molecules of large size being eluted first.

Examples of pea protein compositions according to the invention, and also the details of the method for determining the molecular weights, can be found in patent WO 2007/017572, of which the applicant company is also the proprietor.

According to the present invention, said pea proteins, used for producing the granulated powder can also be "pea protein concentrates" or "pea protein isolates". The pea protein concentrates and isolates are defined from the viewpoint of their protein content (cf. the review by J. Gueguen from 1983 in *Proceedings of European congress on plant proteins for human food* (3-4) pp 267-304):
- the pea protein concentrates are described as having a total protein content of from 60% to 75% with respect to dry matter, and
- the pea protein isolates are described as having a total protein content of 90% to 95% with respect to dry matter, the protein contents being measured by the Kjeldahl method (cf. above), the nitrogen content being multiplied by the factor 6.25.

In another embodiment of the present invention, the pea protein compositions that can be used may be "pea protein hydrolyzates". The pea protein hydrolyzates are defined as preparations obtained by enzyme hydrolysis or chemical hydrolysis, or by both simultaneously or successively, of pea proteins. The protein hydrolyzates are composed of a mixture of peptides of various sizes and of free amino acids. This hydrolysis can have an impact on the solubility of the proteins. The enzyme and/or chemical hydrolysis is, for example, described in patent application WO 2008/001183. Preferably, the protein hydrolysis is not complete, i.e. does not result in a composition comprising only or essentially amino acids and small peptides (from 2 to 4 amino acids). Thus, the hydrolyzates according to the invention are not HPV compositions. The preferred hydrolyzates comprise more than 50%, 60%, 70%, 80% or 90% of proteins of more than 500 Da.

The processes for preparing protein hydrolyzates are well known to those skilled in the art and can, for example, comprise the following steps: dispersion of the proteins in water so as to obtain a suspension, hydrolysis of this suspension by means of the chosen treatment. Most commonly, it will be an enzymatic treatment combining a mixture of various proteases, optionally followed by a thermal treatment intended to inactivate the enzymes that are still active. The solution obtained can then be filtered through one or more membranes so as to separate the insoluble compounds, optionally the residual enzyme, and the high-molecular-weight peptides (greater than 10 000 daltons).

According to the present invention, the granulated vegetable milk powder comprises at least one vegetable protein and at least one starch hydrolyzate.

In the present invention, the term "starch hydrolyzate" denotes any product obtained by acid or enzymatic hydrolysis of legume, cereal or starches. Various processes of hydrolysis are known and have been described, in general, on pages 511 and 512 of the Kirk-Othmer Encyclopedia of Chemical Technology, $3^{rd}$ Edition, Vol. 22, 1978. These hydrolysis products are also defined as purified and concentrated mixtures formed from linear chains made up of D-glucose units and of D-glucose polymers which are essentially α(1→4)-linked, with only 4% to 5% of α(1→6) branched glucosidic linkages, that have extremely varied molecular weights and are completely soluble in water. Starch hydrolyzates are very well known and completely described in the Kirk-Othmer Encyclopedia of Chemical Technology, $3^{rd}$ Edition, Vol. 22, 1978, pp. 499 to 521.

Thus, in the present invention, the starch hydrolysis product is chosen from maltodextrins, glucose syrups, dextrose (crystalline form of α-D-glucose) and any mixtures thereof.

The distinction between the starch hydrolysis products is based mainly on the measurement of their reducing power, conventionally expressed by the notion of dextrose equivalent or DE. The DE corresponds to the amount of reducing sugars, expressed as dextrose equivalent per 100 g of dry matter of the product. The DE therefore measures the strength of the starch hydrolysis, since the more the product is hydrolyzed, the more small molecules (such as dextrose and maltose, for example) it contains and the higher its DE is. Conversely, the more large molecules (polysaccharides) the product contains, the lower its DE is.

From the regulatory point of view, and also for the purpose of the present invention, the maltodextrins have a DE of from 1 to 20, and the glucose syrups have a DE of greater than 20.

Such products are, for example, the maltodextrins and the dehydrated glucose syrups sold by the applicant under the name Glucidex® (available DE=1, 2, 6, 9, 12, 17, 19 for the maltodextrins, and DE=21, 29, 33, 38, 39, 40, 47 for the glucose syrups). Mention may also be made of the glucose syrup sold by the applicant under the name "Roquette sirops de glucose".

According to a first advantageous embodiment of the present invention, the granulated vegetable milk powder comprises at least one pea protein and at least one maltodextrin.

According to a first variant of this embodiment, the granulated vegetable milk powder comprises a pea protein and a maltodextrin having a DE of between 15 and 19.

According to a second embodiment of the invention, the granulated vegetable milk powder comprises a pea protein associated with a glucose syrup, the DE of which does not exceed the value of 47, and preferably 35.

According to a third embodiment of the invention, the granulated vegetable milk powder comprises a pea protein and a mixture of maltodextrins and of glucose syrup.

According to a first variant of this third embodiment, the granulated vegetable milk powder comprises a pea protein and a mixture of maltodextrin having a DE of between 15 and 19 and of glucose syrup, the DE of which does not exceed the value of 47, and preferably 35.

In the context of the present invention, the expression "granulated powder" signifies that there is intimate mixing between the various components of this powder, that their distribution within the powder is substantially homogeneous, and that they are not only linked to one another by simple physical mixing. Interactions between the constituents can occur both outside the particle and inside.

In one particular embodiment, the granulated vegetable milk powder is not coated.

Indeed, in order to produce said granulated vegetable milk powder, the applicant company has noted that it is advisable to use a mixture of at least one pea protein and at least one starch hydrolyzate, and to modify its physical characteristics by employing a suitable process, such that very advantageous functional properties, which cannot be obtained if each compound is used separately or if the compounds are used simultaneously but in the form of a simple mixture of powders, are simultaneously obtained.

In the present invention, said granulated vegetable milk powder is prepared by means of a drying process according to a technique chosen from the group consisting of spray-drying, granulation or extrusion or of any other drying means known to those skilled in the art, and under conditions suitable for the chosen equipment, capable of enabling the production of a granulated vegetable milk powder according to the invention.

The process for manufacturing said granulated vegetable milk powder according to the present invention consists in drying conjointly at least two constituents, and comprises a step of bringing at least one pea protein into intimate contact with at least one starch hydrolyzate, it being possible for this step of bringing into intimate contact to be carried out according to any process known to those skilled in the art, and in particular according to a technique chosen from spray-drying, granulation and extrusion, and any combination of at least two of these techniques, such that said step of bringing into intimate contact results in a dry matter content, determined after stoving at 130° C. for 2 hours, of greater than 80%, preferably greater than 85%, and even more preferably greater than 90%. By way of example, mention will be made of a process for manufacturing said granulated vegetable milk powder according to a single spray-drying technique, or according to a single granulation technique, or else according to a combination of a spray-drying technique followed by a granulation technique.

In one preferred embodiment of the present invention, the granulated vegetable milk powder is suspended in any drinkable liquid intended for human consumption.

Thus, the present invention also relates to a vegetable milk produced by dissolving the granulated vegetable milk powder according to the present invention, characterized in that the dissolution rate of the granulated vegetable milk powder is between 2% and 30% by dry weight, preferably between 2% and 20%, even more preferably between 3% and 15%, and in particular between 5% and 10%.

Preferably, the granulated vegetable milk powder is dissolved in a liquid chosen from the group consisting of water, fruit juices, fruit nectars, vegetable juices, vegetable nectars, and sodas.

Even more preferably, the granulated vegetable milk powder is dissolved in water, it being possible for said water to be spring water or mineral water, which is naturally sparkling or sparkling through the addition of carbon dioxide, or nonsparkling.

In one preferred embodiment of the invention, the granulated vegetable milk powder or the vegetable milk produced by dissolving the granulated vegetable milk powder according to the invention is used to replace milk of animal origin, and more particularly cow's milk.

In another preferred embodiment of the invention, the granulated vegetable milk powder or the vegetable milk produced by dissolving the granulated vegetable milk powder according to the invention is used in the preparation of bottle-feeding foodstuffs, and more particularly in the preparation of bottle-feeding milks for infants and young children.

According to one preferred embodiment of the invention, said vegetable milk is characterized in that it has a pH of between 5 and 9, preferably between 5.5 and 8, and even more preferably between 5.8 and 7.7.

Electronic instruments (pH-meters) make it possible to measure the pH value quite accurately, provided that they are correctly calibrated by means of at least two "standard" solutions, the pH of which is known.

The pH can vary according to the liquid chosen for dissolving the granulated vegetable milk powder. Optionally, it can be corrected by any means known to those skilled in the art, and in particular using acids or bases for use in foods.

In another even more preferred embodiment, the granulated vegetable milk powder or the vegetable milk produced by dissolving the granulated vegetable milk powder according to the invention can be supplemented with other elements, in order to satisfy and comply with all the organoleptic and nutritional characteristics targeted.

According to one advantageous embodiment of the present invention, the vegetable milk in the form of a granulated powder or of a solution also contains a vegetable fiber.

In the present invention, the term "vegetable fiber" denotes soluble and/or insoluble vegetable dietary fibers. The latter denote not only fibrous matter in the strict sense, but also an entire series of different compounds which are contained almost exclusively in foods of vegetable origin and which have the common property that they cannot be broken down by the digestive enzymes of human beings. Almost all dietary fibers are carbohydrate polymers. Over the last few years, nutritionists have focused on a new type of dietary fibers: resistant starch. It is a starch or a starch fraction which is not digested by the small intestine and which is fermented by the bacteria of the colon.

Unlike conventional vegetable fibers, these starches have the advantage of not modifying the appearance of the product into which they are incorporated, and in a way constitute a source of fibers invisible to the naked eye. These starches are recommended in many applications.

Thus, in the present invention, the vegetable fiber is chosen from soluble fibers, insoluble fibers and any mixtures thereof.

According to one advantageous embodiment, the vegetable milk of the present invention, in the form of a granulated powder or of a solution, comprises at least one pea protein composition and at least one soluble vegetable fiber.

Preferably, said soluble fiber of vegetable origin is chosen from the group consisting of fructans, including fructooligosaccharides (FOSs) and inulin, glucooligosaccharides (GOSs), isomaltooligosaccharides (IMOs), trans-galactooligosaccharides (TOSs), pyrodextrins, polydextrose, branched maltodextrins, indigestible dextrins and soluble oligosaccharides derived from oleaginous plants or protein-producing plants.

The term "soluble fiber" is intended to mean fiber soluble in water. The fibers can be assayed according to various AOAC methods. By way of example, mention may be made of AOAC methods 997.08 and 999.03 for fructans, FOSs and inulin, AOAC method 2000.11 for polydextrose, AOAC method 2001.03 for quantitatively determined the fiber contained in branched maltodextrins and indigestible dextrins, or AOAC method 2001.02 for GOSs and also soluble oligosaccharides derived from oleaginous plants or protein-producing plants. Among the soluble oligosaccharides derived from oleaginous plants or protein-producing plants, mention may be made of soya, rapeseed or pea oligosaccharides.

According to one particularly advantageous embodiment of the present invention, the vegetable milk, in the form of a granulated powder or of a solution, comprises pea proteins associated with soluble vegetable fibers which are branched maltodextrins.

The term "branched maltodextrins" is intended to mean the specific maltodextrins identical to those described in patent EP 1.006.128-B1 of which the applicant is the proprietor. These branched maltodextrins have the advantage of representing a source of indigestible fibers beneficial to the metabolism and to the intestinal equilibrium. In particular, use may be made of branched maltodextrins having between 15% and 35% of 1-6 glucosidic linkages, a reducing sugar content of less than 20%, a weight-average molecular mass MW of between 4000 and 6000 g/mol and a number-average molecular mass Mn of between 250 and 4500 g/mol.

Certain subfamilies of branched maltodextrins described in the abovementioned application can also be used in accordance with the invention. They are, for example, high-molecular-weight branched maltodextrins having a reducing sugar content at most equal to 5% and an Mn of between 2000 and 4500 g/mol. Low-molecular-weight branched maltodextrins having a reducing sugar content of between 5% and 20% and a molecular mass Mn of less than 2000 g/mol can also be used.

In the present application, the pyrodextrins denote the products obtained by heating starch brought to a low moisture content, in the presence of acid or basic catalysts, and which generally have a molecular weight of between 1000 and 6000 daltons. This dry roasting of the starch, most commonly in the presence of acid, leads to both depolymerization of the starch and rearrangement of the starch fragments obtained, resulting in highly branched molecules being obtained. This definition targets in particular the "indigestible" dextrins, having an average molecular weight of about 2000 daltons.

Polydextrose is a soluble fiber produced by thermal polymerization of dextrose, in the presence of sorbitol and of an acid as catalyst. An example of such a product is, for example, Litesse® sold by Danisco.

An example of a combination with a vegetable protein which is particularly advantageous is the use of Nutriose®, which is a full range of soluble fibers, recognized for their benefits, and manufactured and sold by the applicant. The products of the Nutriose® range are partially hydrolyzed wheat starch or corn starch derivatives which contain up to 85% fiber. This richness in fiber makes it possible to increase the digestive tolerance, to improve calorie control, to prolong energy release and to obtain a low sugar content. In addition, the Nutriose® range is one of the most well tolerated fibers available on the market. It shows higher digestive tolerance, allowing better incorporation than other fibers, thereby representing real dietary advantages.

According to another preferred embodiment of the present invention, the vegetable milk, in the form of a granulated powder or of a solution, comprises pea proteins and at least one insoluble vegetable fiber.

Preferably, said insoluble vegetable fiber is chosen from the group consisting of resistant starches, cereal fibers, fruit fibers, fibers from vegetables, leguminous plants fibers and mixtures thereof.

Mention may, for example, be made of fibers such as bamboo, pea or carrot fibers.

According to a first variant, said granulated vegetable milk powder or the vegetable milk produced by dissolving the granulated vegetable milk powder comprises pea proteins and at least one insoluble vegetable fiber, and preferably one leguminous plant fiber, and even more preferably one pea fiber.

According to a second variant, the insoluble vegetable fiber is a resistant starch. Natural resistant starches or resistant starches obtained by chemical and/or physical and/or enzymatic modification may be used without distinction.

According to the present invention, the term "resistant starch" denotes a starch or a starch fraction which is not digested in the small intestine and which is fermented by the bacteria of the colon. Four categories of resistant starch have been identified:

- encapsulated starches, present in most unrefined vegetable foods such as dry vegetables, which are inaccessible to enzymes (RS1),
- the granular starch of certain raw foods, such as bananas or potatoes, and amylose-rich starches (RS2),
- retrograded starches, which are found in foods which have been cooked and then refrigerated or frozen (RS3),
- chemically modified starches such as, in particular, etherified or esterified starches (RS4).

These resistant starches reduce the glycemic response, improve the health of the digestive system by virtue of their prebiotic properties and contribute to the regularity of transit, without having a high calorie content.

According to a third variant, the insoluble vegetable fiber comprises a mixture of at least one resistant starch and of a pea fiber.

Preferably, a resistant starch derived from starch having an amylose content of greater than 50% will be used. The Eurylon® amylose-rich starches sold by the applicant are particularly suitable.

According to another particularly advantageous embodiment of the invention, the granulated vegetable milk powder or the vegetable milk produced by dissolving the granulated vegetable milk powder comprises pea proteins and a mixture of soluble and insoluble fibers.

Advantageously, the soluble fibers are branched maltodextrins when the insoluble fibers are chosen from leguminous plants fibers and resistant starches, or are a mixture of the two.

According to one particularly advantageous feature of the invention, said leguminous plant from which the leguminous plants fibers or the leguminous plants proteins are derived is selected from the group comprising alfalfa, clover, lupine, pea, bean, broad bean, horse bean, lentil and mixtures thereof.

According to one advantageous embodiment of the present invention, the granulated vegetable milk powder or the vegetable milk produced by dissolving the granulated vegetable milk powder also contains an element selected from the group comprising vitamins, trace elements, mineral salts and mixtures thereof.

Vitamins are substances which do not provide energy but which are essential for the correct functioning of the body. They are involved, at low concentration, in many vital processes. In order to develop harmoniously, our bodies must have a regular supply of these substances that it cannot synthesize itself (except vitamin D synthesized in the skin under the action of sunlight, and vitamins B2 and K synthesized by humans by means of their intestinal flora; however, this endogenous production is not sufficient to meet their needs, making it necessary for them to provide the rest in their diet).

Vitamins are provided by the diet. There are thirteen of them and they are divided up into two categories:

- liposoluble vitamins which are absorbed at the same time as fats and stored. They are soluble in organic solvents. These are vitamins A, D, E and K;
- hydrosoluble vitamins which are not stored over long periods of time and which are excreted in the urine when they are supplied in excess. They are soluble in water. These are vitamins C, B1, B2, PP, B5, B6, B8, B9 and B12.

According to one even more preferred embodiment, the granulated vegetable milk powder or the vegetable milk produced by dissolving the granulated vegetable milk powder contains at least one vitamin chosen from the group consisting of: vitamin B1, vitamin B2, vitamin B9, vitamin B12, vitamin A, vitamin D, and any mixtures thereof.

According to another advantageous embodiment of the present invention, the granulated vegetable milk powder or the vegetable milk produced by dissolving the granulated vegetable milk powder can also be supplemented with trace elements.

Trace elements are a class of micronutrients necessary for life, but in very small amounts, of about one µg, and which the body cannot produce.

Deficiencies, just like excesses, are prejudicial and toxic to the body. The effect of a trace element depends on the intake amount. When the trace element is said to be essential, an absence, like an excessive intake, is lethal.

Essential trace elements meet the following criteria:

- being present at a barely variable concentration in the tissues of an organism;
- causing, by their absence, close structural and physiological abnormalities, in a similar manner in several species;
- preventing or correcting these disorders by their presence alone.

From a nutritional point of view, it is possible to distinguish two types of trace element according to the risk of deficiency:

- essential trace elements with the demonstrated risk of deficiency: iodine, iron, copper, fluorine, zinc, selenium, chromium, molybdenum,
- essential trace elements with a low risk of deficiency or a risk of deficiency not proven in humans: manganese, silicon, vanadium, nickel and tin.

According to one even more preferred embodiment, the granulated vegetable milk powder or the vegetable milk produced by dissolving the granulated vegetable milk powder contains at least one "essential" trace element chosen from the group consisting of: iodine, iron, copper, fluorine, zinc, selenium, chromium, molybdenum, and any mixtures thereof.

According to a third advantageous embodiment of the present invention, the granulated vegetable milk powder or the vegetable milk produced by dissolving the granulated vegetable milk powder can also be supplemented with at least one mineral salt.

Mineral salts are components of the body, of mineral origin. Like vitamins, they are not a source of energy, but are nevertheless essential for life. They are provided in ionic form (anions or cations).

In the present application, the mineral salts concern components present in the body in large amounts (a few grams). They are also called macroelements, unlike trace elements present in small amounts, or even in trace amounts, which have already been mentioned in the present application.

The mineral salts in the present application are chosen from the group consisting of sodium, potassium, calcium, iron, magnesium and phosphorus, taken alone or in combination.

According to one more preferred embodiment, the granulated vegetable milk powder or the vegetable milk produced by dissolving the granulated vegetable milk powder contains calcium.

Calcium performs an essential role in the constitution of the skeleton and the teeth, and also in blood coagulation, muscle activity, hormonal functions, etc. Calcium intakes from the diet are essential since the body eliminates a part of the calcium that it contains every day.

One of the major advantages of the present invention is that of being able to provide the body with all the calcium required in everyday life and required for correct functioning of the body.

Thus, this calcium supplementation of the granulated vegetable milk powder or of the vegetable milk produced by dissolving said granulated vegetable milk powder makes it possible to completely eliminate dairy products from the daily diet, without however inducing any calcium deficiency or any calcium deficit.

Thus, the supplementation of the granulated vegetable milk powder or of the vegetable milk produced by dissolving the granulated vegetable milk powder, with an element selected from the group comprising vitamins, trace elements, mineral salts and mixtures thereof, makes it possible to produce novel food products which are entirely capable of completely replacing drinks of milk origin and/or dairy products, without introducing any deficit or deficiency whatsoever.

According to one preferred embodiment of the granulated vegetable milk powder or vegetable milk produced by dissolving the granulated vegetable milk powder contains an element chosen from the group comprising calcium, phosphorus, vitamin B1, vitamin B2, vitamin B12, vitamin B19, vitamin A, vitamin D and mixtures thereof.

According to another even more preferred embodiment, the granulated vegetable milk powder or the vegetable milk produced by dissolving the granulated vegetable milk powder contains at least one fatty acid, and preferably at least one essential fatty acid.

Fatty acids are lipid compounds which participate in an essential manner in the construction and life of cells. Essential fatty acids are fatty acids that the body is not capable of producing and that it must imperatively find in foodstuffs or in food supplements.

Generally, fatty acids and essential fatty acids play an essential role in correct cell functioning, in particular for the composition of the cell membrane and energy provision. They also have a role in inflammation, immunity and blood coagulation.

There are three types of fatty acids: saturated, monounsaturated and polyunsaturated fatty acids.

The consumption of saturated fatty acids is not recommended since an overconsumption of fatty acids of this type is directly correlated with blood cholesterol level, and therefore with increased risks of cardio-vascular diseases.

According to one preferred embodiment, the granulated vegetable milk powder or the vegetable milk produced by dissolving the granulated vegetable milk powder does not contain saturated fatty acids.

According to another preferred embodiment, the granulated vegetable milk powder or the vegetable milk produced by dissolving the granulated vegetable milk powder contains only at least one essential fatty acid.

Essential fatty acids are divided into two groups: the group of omega-3 fatty acids and the group of omega-6 fatty acids. These two groups are polyunsaturated fatty acids.

The main fatty acids of the omega-3 group are alpha-linolenic acid, eicosapentaenoic acid and docosahexaenoic acid. They are usually found in algae, "fatty" fish (mackerel, salmon, tuna, sardines, herring, halibut, anchovy, etc.), and in certain vegetable oils such as, for example, linseed oil, rapeseed oil or walnut oil.

A very large number of studies have demonstrated the positive effects of an omega-3-rich diet in improving the health in general and in cardiovascular health in particular.

The main fatty acids of the omega-6 group are linoleic acid, which is usually found in vegetable oils such as, for example, sunflower oil, grapeseed oil, evening primrose oil, wheat germ oil or walnut oil; arachidonic acid found in animal flesh (meats); and docosapentaenoic acid found in certain fish and offal.

According to one preferred embodiment, the granulated vegetable milk powder or the vegetable milk produced by dissolving the granulated vegetable milk powder contains at least one essential fatty acid chosen from the group consisting of alpha-linolenic acid, linoleic acid, arachidonic acid, docosapentaenoic acid and mixtures thereof.

One of the variants of the present invention also relates to a granulated vegetable milk powder or the vegetable milk produced by dissolving the granulated vegetable milk powder, characterized in that it can be colored and/or flavored.

In the present invention, the coloring can be provided by a food dye, considered to be a food additive according to European directive No. 89/107/EEC of Dec. 21, 1988, on the approximation of the laws of the Member States concerning food additives authorized for use in foodstuffs intended for human consumption.

In the present invention, the name "dye" denotes any substance not normally consumed as a food per se and not normally used as a characteristic ingredient in the diet, possibly having a nutritive value, and the intentional addition of which to foodstuffs, for technological purposes at the stage of their manufacture, processing, preparation, treatment, packaging, transport or storage, has the effect, or can reasonably be considered to have the effect, that it itself becomes or that its derivatives become, directly or indirectly, a component of the foodstuffs.

In the present invention, the name "dye" denotes any substance added artificially to a food in order to change the color thereof, and theoretically make it more appetizing. It may be of natural (organic or inorganic) origin, or of synthetic origin. Examples of food dyes that can be added to the granulated vegetable milk powder or to the vegetable milk produced by dissolving the granulated vegetable milk powder are, for example, curcurmin (yellow), cochineal red A (red), chlorophyllins (green), caramel (brown), carotenoids (orange), etc.

Other examples of dyes in the present invention are also natural pigments such as, for example, the natural pigments of carrot, lobster, fish, and also the natural pigments of flowers, leaves and fruits (apricots, red fruits, etc.).

In the present invention, the granulated vegetable milk powder or the vegetable milk produced by dissolving the granulated vegetable milk powder can also be flavored by means of the addition of one or more aromas.

In the present invention, the name "aroma" denotes any substances not intended to be consumed as they are, which are added to foodstuffs in order to give them an odor and/or a flavor or to modify the odor and/or flavor. They are derived from or made up of the following categories: flavoring substances, flavoring preparations, aromas obtained by heat treatment, smoke aromas, aroma precursors or other aromas, or mixtures thereof.

The flavoring substances are defined chemical substances, which includes flavoring substances obtained by chemical synthesis or isolated by chemical processes, and natural flavoring substances. The flavoring preparations are aromas, other than defined chemical substances, which are obtained by suitable physical, enzymatic or microbiological processes, from materials of vegetable, animal or microbiological origin taken as they are or after transformation thereof for human consumption. The aroma precursors such as carbohydrates, oligopeptides and amino acids give the foodstuffs a flavor by means of chemical reactions which occur during the conversion of these foodstuffs.

Finally, the present invention also relates to a process for preparing vegetable milk, characterized in that a granulated vegetable milk powder comprising a pea protein composition and at least one starch hydrolyzate, and having a laser volume mean diameter D4,3 of between 10 µm and 500 µm, preferably between 50 µm and 350 µm, and even more preferably between 70 µm and 250 µm, and a dry matter content, determined after stoving at 130° C. for 2 hours, of greater than 80%, preferably greater than 85%, and even more preferably greater than 90%, is suspended in water at a degree of dissolution of between 2% and 30% by dry weight, preferably between 2% and 20%, even more preferably between 3% and 15%, and in particular between 5% and 10%.

In one preferred embodiment, the various elements or ingredients that can be added to the granulated vegetable milk powder or to the vegetable milk produced by dissolving the granulated vegetable milk powder are added during the process for preparing the vegetable milk, i.e. during the suspension of the granulated vegetable milk powder in a food liquid.

The invention will be understood more clearly on reading the examples which follow, which are meant to be nonlimiting illustrations referring only to certain embodiments and certain advantageous properties according to the invention.

Example 1

Vegetable Milk According to the Present Invention

This example represents a basic formula of a natural vegetable milk (without flavoring).

Subsequently, according to the intended targets (foods for bottle-feeding, and more particularly foods for the preparation of bottle-feeding milks for infants and young children, or foods intended for the entire family, for example), supplementations (vitamins, mineral elements, trace elements, etc.) may be carried out.

In this example, the vegetable milk was produced by dissolving, in water, a granulated vegetable milk powder according to the present invention.

Said granulated vegetable milk powder was produced using a pea protein composition/maltodextrins weight ratio of 70/30.

The granulated vegetable milk powder therefore contains 70% of a pea protein composition (with a total protein content of 85%) and 30% of maltodextrins having a DE of 19.

A natural vegetable milk was prepared.

Its nutritional composition was determined and said vegetable milk was tasted and graded by a sensory analysis jury.

1. Recipe Used

TABLE 1

| Ingredients | Used (weight) |
| --- | --- |
| Granulated vegetable milk powder according to the invention | 7.6 |
| Glucidex ® DE 19 maltodextrin | 4.7 |
| Sunflower oil | 1.6 |
| Water | 86.2 |
| TOTAL | 100 |

The formula of table 1 was established on the basis of the nutritional composition of a UHT sterilized semi-skimmed commercial cow's milk.

In order to have the same carbohydrate contents as the commercial milk, additional maltodextrins were added to the formula.

They also make it possible to give the vegetable milk body in the mouth.

2. Procedure

The water was heated to 65° C.

The granulated vegetable milk powder and the Glucidex® DE 19 maltodextrin were added to the water, and the whole mixture was left at ambient temperature for a minimum of 30 minutes in order to allow good hydration of the two added products.

The sunflower oil was gradually added to the above mixture, with stirring by means of a Polytron® mixer, at a speed of 4000 rpm. The stirring was maintained for 2 minutes.

The above mixture was then homogenized using a Niro® Soavi (GEA group) homogenizer at a pressure of 250 bar.

The resulting emulsion was then sterilized on a minicooker with the motor mark set such that the vegetable milk has an exit temperature of between 136 and 140° C. The set temperature of the cooker was 190° C. and the motor mark was set on 3.5.

The packaging was then carried out in sterile plastic bottles having a volume of 1 l, and the filling of the bottles at output was flame-sterilized.

3. Results

Composition of the Vegetable Milk Produced

| | |
| --- | --- |
| Proteins/dry basis | 4% |
| Carbohydrates/dry basis | 4.60% |
| Energy value in Kcal/100 ml | 48.5 |
| pH | 7.54 |

The composition of the natural vegetable milk obtained is identical to the nutritional composition of a UHT sterilized semi-skimmed milk. The present invention therefore makes it possible to get close to, in terms of nutritional composition, a conventional cow's milk.

This example was based on a semi-skimmed milk, but the same thing can be carried out using skimmed milk or whole milk as a basis.

Sensory Analysis

The natural vegetable milk was tasted and compared, by a jury of experts in sensory analysis made up of 20 individuals, with a commercial UHT sterilized semi-skimmed cow's milk, and also with a commercial natural soya milk.

The following parameters were tested and graded on a scale of 1 to 5, 1 being the poorest grade and 5 the best: color, taste, smoothness in the mouth, consistency, general grade.

| | UHT cow's milk | Vegetable milk according to the present invention | Natural soya milk |
| --- | --- | --- | --- |
| Color | 5 | 4 | 4 |
| Taste | 5 | 4 | 2 |
| Smoothness in the mouth | 5 | 5 | 4 |
| Consistency | 5 | 5 | 3 |
| General grade | 5 | 5 | 3 |

The natural version of the vegetable milk according to the present invention has a very slight after-taste of pea and of cereals compared with the commercial cow's milk. Its color is also not as white as that of the cow's milk. That said, in terms of the smoothness in the mouth and the consistency, the vegetable milk of the present invention was graded similarly to the cow's milk.

The general grade obtained was, moreover, the maximum grade of 5, evidence that the vegetable milk was very well-liked by the members of the jury.

The vegetable milk was also compared with a commercial natural soya milk, and was judged to be of much better quality, in terms of taste, smoothness in the mouth and consistency.

A stability study was also carried out, and the present vegetable milk is preserved very well over time, even at ambient temperature.

The advantage of the present invention is therefore completely demonstrated by this example.

Example 2

Sweetened Vegetable Milk According to the Present Invention

This example represents a base formula of a sweetened but nonflavored vegetable milk.

The granulated vegetable milk powder used to prepare the vegetable milk is identical to that used in example 1.

The granulated vegetable milk powder therefore contains 70% of a pea protein composition (at a total protein content of 85%) and 30% of maltodextrins having a DE of 19.

1. Recipe Used

| Ingredients | Used (weight) |
|---|---|
| Granulated vegetable milk powder according to the invention | 7.6 |
| Glucidex ® DE 19 maltodextrin | 4.6 |
| Sunflower oil | 1.6 |
| Cane sugar syrup | 4 |
| Water | 82.2 |
| TOTAL | 100 |

2. Procedure

The same procedure as that described in example 1 was used. The cane sugar syrup was added at the same time as the sunflower oil, i.e. before the mixture was introduced into the homogenizer.

3. Results

Composition of the Vegetable Milk Obtained

| | |
|---|---|
| Proteins/dry basis | 4% |
| Carbohydrates/dry basis | 10% |
| Energy value in Kcal/l00 ml | 70 |
| pH | 7.39 |

This milk was also subjected to tasting by the jury of experts in sensory analysis made up of 20 individuals.

The very slight after-taste of pea and cereals noted for the natural vegetable milk is reduced in this version of sweetened natural vegetable milk.

The energy value of this sweetened vegetable milk is also higher, and it could, for example, be intended for individuals who need drinks with a high energy value.

Example 3

Fruity Flavored Vegetable Milk According to the Present Invention

This example represents a formula of a fruity flavored vegetable milk corresponding, from the nutritional point of view, to a growth milk for children more than 12 months old.

The granulated vegetable milk powder used to prepare the vegetable milk is identical to that used in example 1.

The granulated vegetable milk powder therefore contains 70% of a pea protein composition (at a total protein content of 85%) and 30% of maltodextrins having a DE of 19.

The fruity flavored nature was obtained using a mixture of stewed apple, pear juice and natural peach flavoring (company Mane et Fils, Le Bar sur Loup).

1. Recipe Used

| Ingredients | Used (weight) |
|---|---|
| Granulated vegetable milk powder according to the invention | 5.50 |
| Glucidex ® DE 19 maltodextrin | 5.66 |
| Rapeseed oil | 0.63 |
| Sunflower oil | 0.27 |
| Stearin oil | 0.85 |
| Water | 77.81 |
| Stewed apple | 5.00 |
| Pear juice | 3.00 |
| Peach flavoring | 0.30 |
| Nutriose ® FB 06 | 0.98 |
| Vitamins: | |
| B1 | 0.1 mg |
| B2 | 0.2 mg |
| Mineral salts: | |
| Calcium | 77 mg |
| Magnesium | 9 mg |
| TOTAL | 100 |

Nutriose® FB06 is a soluble fiber also sold by the applicant company.

2. Procedure

The water was heated to 65° C.

The granulated vegetable milk powder, the Glucidex® maltodextrin having a DE of 19 and the Nutriose® FB06 were added to the water, and the whole mixture was left at ambient temperature for a minimum of 30 minutes in order to allow good hydration of the three added products.

The stewed apple, the pear juice and the peach flavoring were added.

The lipids were then gradually added to the above mixture, with stirring by means of a Polytron® mixer, at a speed of 4000 rpm. The stirring was maintained for 3 minutes.

The above mixture was then homogenized using a Niro® Soavi (GEA group) homogenizer at a pressure of 250 bar.

The resulting emulsion was then pasteurized in a water bath at 90° C. for 30 minutes.

The vitamins and the mineral salts were then added by means of sterile solutions containing them.

The fruity flavored vegetable milk was distributed into sterile bottles having a volume of one liter, and the whole was placed in a refrigerator for storage before tasting.

3. Results

Composition of the Fruity Flavored Vegetable Milk Obtained

| | In g/100 ml of flavored vegetable milk |
|---|---|
| Proteins | 2 |
| Carbohydrates | 9 |
| Lipids | 2 |

|  | In g/100 ml of flavored vegetable milk |
| --- | --- |
| Fiber | 0.8 |
| Energy value in Kcal/l00 ml | 61 |

In terms of the nutritional value of this fruity flavored vegetable milk, the protein, carbohydrate and lipid contents are similar to the contents found in commercial growth milks.

In this example, supplementation with vitamins and minerals was carried out.

Depending on the intended objective, other vitamins, minerals, or the like, may be provided.

This fruity flavored vegetable milk was also subjected to tasting by the jury of experts in sensory analysis made up of 20 individuals.

Its taste, its smoothness in the mouth and its consistency were judged to be very satisfactory by the entire panel.

This example demonstrates completely that the granulated vegetable milk powder of the present invention makes it possible to prepare a fruity flavored vegetable milk intended for the bottle-feeding of young children, and which has the same nutritional values as a conventional growth milk used and formulated with cow's milk.

This makes it possible to eliminate any risks of allergies related to cow's milk while at the same time making it possible to avoid nutritional deficiencies.

Depending on the intended target and impact, various supplementations can be made.

The invention claimed is:

1. A granulated vegetable milk powder comprising at least one pea protein composition and at least one maltodextrin, wherein said powder has:
   a laser volume average diameter D4,3 of between 10 μm and 500 μm, and
   a dry matter content, determined after stoving at 130° C. for 2 hours, of greater than 90%,
   wherein the weight ratio of the pea protein composition to the maltodextrin of the granulated powder is between 80:20 and 55:45;
   wherein the distribution of pea protein and the maltodextrin within the powder is substantially homogeneous;
   wherein the sum of the amounts of the pea proteins and maltodextrin in said granulated powder is between 90% and 100% of the total dry mass of said granulated powder;
   wherein said at least one maltodextrin has a DE of between 15 and 19; and
   wherein the granulated vegetable milk powder, when dissolved in water, produces a vegetable milk with equivalent consistency and smoothness in the mouth to cow's milk; and
   wherein the granulated vegetable milk powder does not contain a saturated fatty acid.

2. The granulated vegetable milk powder according to claim 1, wherein the weight ratio of the pea protein composition to the maltodextrin of the granulated powder is between 70:30 and 55:45.

3. The granulated vegetable milk powder according to claim 1, wherein the granulated vegetable milk powder further comprises glucose syrups, dextrose and mixtures thereof.

4. The granulated vegetable milk powder according to claim 1, wherein said granulated milk powder also contains a vegetable fiber.

5. The granulated vegetable milk powder according to claim 4, wherein the vegetable fiber is selected from soluble fiber, insoluble fiber and mixtures thereof.

6. The granulated vegetable milk powder according to claim 5, wherein said soluble vegetable fiber is selected from the group consisting of fructans, glucooligosaccharides (GOSs), isomaltooligosaccharides (IMOs), trans-galactooligosaccharides (TOSs), pyrodextrins, polydextrose, branched maltodextrins, indigestible dextrins and soluble oligosaccharides derived from oleaginous plants or protein-producing plants.

7. The granulated vegetable milk powder according to claim 6, wherein said soluble vegetable fiber is a branched maltodextrin.

8. The granulated vegetable milk powder according to claim 5, wherein said insoluble vegetable fiber is selected from the group consisting of resistant starches, cereal fiber, fruit fiber, vegetable fiber, legume fiber and mixtures thereof.

9. The granulated vegetable milk powder according to claim 1, wherein said granulated vegetable milk powder further comprises a component selected from the group consisting of vitamins, trace elements, mineral salts and mixtures thereof.

10. The granulated vegetable milk powder according to claim 9, wherein the component is selected from the group consisting of calcium, phosphorus, vitamin B1, vitamin B2, vitamin B12, vitamin B19, vitamin A, vitamin D and mixtures thereof.

11. The granulated vegetable milk powder according to claim 1, wherein said granulated vegetable milk powder is flavored and/or colored.

12. The granulated vegetable milk powder according to claim 1, wherein said granulated vegetable milk powder contains only vegetable ingredients.

13. The granulated vegetable milk powder according to claim 1, wherein the pea protein composition has a molecular weight distribution profile consisting of:
   1% to 8% of proteins of more than 100,000 Da,
   20% to 55% of proteins of more than 15,000 Da and of at most 100,000 Da,
   15% to 30% of proteins of more than 5,000 Da and of at most 15,000 Da,
   and from 25% to 55% of proteins of at most 5000 Da.

14. A process for preparing vegetable milk comprising dissolving a granulated vegetable milk powder according to claim 1 is dissolved in water, thereby producing a vegetable milk having equivalent consistency and smoothness in the mouth to cow's milk.

15. A vegetable milk comprising a liquid comprising water and a granulated vegetable milk powder dissolved in said liquid, wherein said powder has at least one pea protein composition and at least one maltodextrin, wherein said powder has:
   a laser volume average diameter D4,3 of between 10 μm and 500 μm, and
   a dry matter content, determined after stoving at 130° C. for 2 hours, of greater than 90%,
   wherein the weight ratio of the pea protein to maltodextrin in the granulated powder is between 80:20 and 55:45;
   wherein the distribution of pea protein and maltodextrin within the powder is substantially homogeneous;
   wherein the at least one maltodextrin has a DE of between 15 and 19; and
   wherein the sum of the amounts of pea proteins and said at least one maltodextrin in said granulated powder is between 90% and 100% of the total dry mass of said granulated powder, said vegetable milk having equivalent consistency and smoothness in the mouth to cow's milk; and wherein the granulated vegetable milk powder does not contain a saturated fatty acid.

16. The vegetable milk according to claim 15, wherein the degree of dissolution of the granulated vegetable milk powder is between 2% and 30% by dry weight.

17. The vegetable milk according to claim 15, having a pH of between 5 and 9.

18. The vegetable milk according to claim 15, wherein said vegetable milk contains only vegetable ingredients.

\* \* \* \* \*

UNITED STATES PATENT AND TRADEMARK OFFICE
CERTIFICATE OF CORRECTION

| | | |
|---|---|---|
| PATENT NO. | : 9,131,710 B2 | Page 1 of 1 |
| APPLICATION NO. | : 13/203038 | |
| DATED | : September 15, 2015 | |
| INVENTOR(S) | : Bernard Boursier et al. | |

It is certified that error appears in the above-identified patent and that said Letters Patent is hereby corrected as shown below:

IN THE SPECIFICATION

Column 1,
Line 29, "she-assess," should read --she-asses,--.

Column 3,
Line 47, "50%; increase" should read --50% increase--.

Column 20,
Line 37, "FB06" should read --FB 06--.

Signed and Sealed this
Eighth Day of March, 2016

Michelle K. Lee
*Director of the United States Patent and Trademark Office*